US008460797B1

(12) United States Patent
Buhrts et al.

(10) Patent No.: US 8,460,797 B1
(45) Date of Patent: Jun. 11, 2013

(54) CAPPED COMPONENT AND METHOD FOR FORMING

(75) Inventors: Bryan K. Buhrts, Wilmington, OH (US); Burch E. Zehner, Gahanna, OH (US); William G. Taylor, Columbus, OH (US); Scott A. Haemmerle, Cincinnati, OH (US); Brett Harris, Kingston, OH (US)

(73) Assignee: TimberTech Limited, Wilmington, OH (US)

( * ) Notice: Subject to any disclaimer, the term of this patent is extended or adjusted under 35 U.S.C. 154(b) by 549 days.

(21) Appl. No.: 12/635,532

(22) Filed: Dec. 10, 2009

Related U.S. Application Data

(63) Continuation-in-part of application No. 11/967,434, filed on Dec. 31, 2007, now abandoned, and a continuation of application No. 11/935,217, filed on Nov. 5, 2007, now abandoned.

(60) Provisional application No. 60/882,869, filed on Dec. 29, 2006.

(51) Int. Cl.
 *B32B 23/04* (2006.01)
(52) U.S. Cl.
 USPC ........ 428/532; 428/534; 427/324; 427/412.2; 427/415
(58) Field of Classification Search
 USPC ................ 428/532, 636; 427/324, 412.2, 415
 See application file for complete search history.

(56) References Cited

U.S. PATENT DOCUMENTS

| | | | |
|---|---|---|---|
| 2,072,687 A | 3/1937 | Robinson |
| 2,153,316 A | 4/1939 | Sherrard et al. |
| 2,156,160 A | 4/1939 | Olson et al. |
| 2,188,396 A | 1/1940 | Semon |
| 2,306,274 A | 12/1942 | Meiler |
| 2,316,283 A | 4/1943 | Piperoux et al. |
| 2,451,558 A | 10/1948 | Schlosser |
| 2,489,373 A | 11/1949 | Gilman |
| 2,519,442 A | 8/1950 | Delorme et al. |
| 2,535,373 A | 12/1950 | Shearer et al. |
| 2,558,378 A | 6/1951 | Petry |
| 2,634,534 A | 4/1953 | Brown |
| 2,635,976 A | 4/1953 | Meiler et al. |
| 2,680,102 A | 6/1954 | Becher |
| 2,759,837 A | 8/1956 | Roberts |
| 2,789,903 A | 4/1957 | Lukman et al. |
| 2,935,763 A | 5/1960 | Newman et al. |
| 2,976,164 A | 3/1961 | Glab |
| 3,287,480 A | 11/1966 | Wechsler et al. |
| 3,308,218 A | 3/1967 | Wiegand et al. |
| 3,309,444 A | 3/1967 | Schueler |
| 3,492,388 A | 1/1970 | Inglin-Knuse |
| 3,493,527 A | 2/1970 | Schueler |
| 3,533,906 A | 10/1970 | Reiniger |
| 3,562,373 A | 2/1971 | Logrippo |
| 3,645,939 A | 2/1972 | Gaylord |
| 3,671,615 A | 6/1972 | Price |
| 3,769,380 A | 10/1973 | Wiley |
| 3,852,387 A | 12/1974 | Bortnick et al. |
| 3,864,201 A | 2/1975 | Susuki et al. |
| 3,867,493 A | 2/1975 | Seki |
| 3,878,143 A | 4/1975 | Baumann et al. |
| 3,879,505 A | 4/1975 | Boutillier et al. |
| 3,888,810 A | 6/1975 | Shinomura |
| 3,899,559 A | 8/1975 | Johanson et al. |
| 3,908,902 A | 9/1975 | Collins et al. |
| 3,922,328 A | 11/1975 | Johnson |
| 3,931,384 A | 1/1976 | Forquer et al. |
| 3,943,079 A | 3/1976 | Hamed |
| 3,954,555 A | 5/1976 | Kole et al. |
| 3,956,541 A | 5/1976 | Pringle |
| 3,956,555 A | 5/1976 | McKean |
| 3,969,459 A | 7/1976 | Fremont et al. |
| 4,005,035 A | 1/1977 | Deaver |
| 4,005,162 A | 1/1977 | Bucking |
| 4,012,348 A | 3/1977 | Chelland et al. |
| 4,016,232 A | 4/1977 | Pringle |
| 4,016,233 A | 4/1977 | Pringle |
| 4,018,722 A | 4/1977 | Baker |
| 4,029,831 A | 6/1977 | Daunheimer |
| 4,045,603 A | 8/1977 | Smith |
| 4,048,101 A | 9/1977 | Nakamachi et al. |
| 4,056,591 A | 11/1977 | Goettler et al. |
| 4,058,580 A | 11/1977 | Flanders |
| 4,071,479 A | 1/1978 | Broyde et al. |
| 4,071,494 A | 1/1978 | Gaylord |
| 4,081,582 A | 3/1978 | Butterworth et al. |

(Continued)

FOREIGN PATENT DOCUMENTS

| | | |
|---|---|---|
| CA | 2153659 A1 | 2/1999 |
| CH | 580130 A5 | 9/1976 |

(Continued)

OTHER PUBLICATIONS

ASTM, Standard Terminology Relating to Wood-Base Fiber and Particle Panel Material, 1995 Annual Book of ASTM Standards, vol. 04.10, Oct. 1986, pp. 214-216.

(Continued)

*Primary Examiner* — Leszek Kiliman (74) *Attorney, Agent, or Firm* — Standley Law Group LLP (57) ABSTRACT

A method of manufacturing a component comprised of a substrate layer and a cap layer. In one exemplary embodiment, multiple co-extruded wood composite components may be formed simultaneously. In another exemplary embodiment, a component may have a substrate layer comprised of cellulosic material. The cap layer may also include cellulosic filler and at least one streaker. The resulting component may serve a variety of different uses. For example, the component may be used in railing systems such as for decks, porches, fences, stairs, or other suitable applications.

20 Claims, 6 Drawing Sheets

U.S. PATENT DOCUMENTS

| | | |
|---|---|---|
| 4,091,153 A | 5/1978 | Holman |
| 4,097,648 A | 6/1978 | Pringle |
| 4,101,050 A | 7/1978 | Buckler et al. |
| 4,102,106 A | 7/1978 | Golder et al. |
| 4,107,110 A | 8/1978 | Lachowicz et al. |
| 4,115,497 A | 9/1978 | Halmo et al. |
| 4,129,132 A | 12/1978 | Butterworth et al. |
| 4,133,930 A | 1/1979 | Wright et al. |
| 4,145,389 A | 3/1979 | Smith |
| 4,157,415 A | 6/1979 | Lindenberg |
| 4,168,251 A | 9/1979 | Schinzel et al. |
| 4,178,411 A | 12/1979 | Cole et al. |
| 4,181,764 A | 1/1980 | Totten |
| 4,187,352 A | 2/1980 | Klobbie |
| 4,191,798 A | 3/1980 | Schumacher et al. |
| 4,192,839 A | 3/1980 | Hayashi et al. |
| 4,198,363 A | 4/1980 | Noel |
| 4,203,876 A | 5/1980 | Dereppe et al. |
| 4,228,116 A | 10/1980 | Colombo et al. |
| 4,239,679 A | 12/1980 | Rolls et al. |
| 4,241,125 A | 12/1980 | Canning et al. |
| 4,241,133 A | 12/1980 | Lund et al. |
| 4,244,903 A | 1/1981 | Schnause |
| 4,248,743 A | 2/1981 | Goettler |
| 4,248,820 A | 2/1981 | Haataja |
| 4,250,222 A | 2/1981 | Mavel et al. |
| 4,263,184 A | 4/1981 | Leo et al. |
| 4,263,196 A | 4/1981 | Schumacher et al. |
| 4,272,577 A | 6/1981 | Lyng |
| 4,273,688 A | 6/1981 | Porzel et al. |
| 4,277,428 A | 7/1981 | Luck et al. |
| 4,290,988 A | 9/1981 | Nopper et al. |
| 4,297,408 A | 10/1981 | Stead et al. |
| 4,303,019 A | 12/1981 | Haataja et al. |
| 4,305,901 A | 12/1981 | Prince et al. |
| 4,317,765 A | 3/1982 | Gaylord |
| 4,323,625 A | 4/1982 | Coran et al. |
| 4,351,873 A | 9/1982 | Davis |
| 4,376,144 A | 3/1983 | Goettler |
| 4,382,108 A | 5/1983 | Carroll et al. |
| 4,382,758 A | 5/1983 | Nopper et al. |
| 4,393,020 A | 7/1983 | Li et al. |
| 4,414,267 A | 11/1983 | Coran et al. |
| 4,420,351 A | 12/1983 | Lussi et al. |
| 4,430,468 A | 2/1984 | Schumacher |
| 4,440,708 A | 4/1984 | Haataja et al. |
| 4,480,061 A | 10/1984 | Coughlin et al. |
| 4,481,701 A | 11/1984 | Hewitt |
| 4,491,553 A | 1/1985 | Yamada et al. |
| 4,503,115 A | 3/1985 | Hemels et al. |
| 4,505,869 A | 3/1985 | Nishibori |
| 4,506,037 A | 3/1985 | Suzuki et al. |
| 4,508,595 A | 4/1985 | Gasland |
| 4,518,552 A | 5/1985 | Matsuo et al. |
| 4,562,218 A | 12/1985 | Fornadel et al. |
| 4,594,372 A | 6/1986 | Natov et al. |
| 4,597,928 A | 7/1986 | Terentiev et al. |
| 4,610,900 A | 9/1986 | Nishibori |
| 4,645,631 A | 2/1987 | Hegenstaller et al. |
| 4,659,754 A | 4/1987 | Edwards et al. |
| 4,663,225 A | 5/1987 | Farley et al. |
| 4,686,251 A | 8/1987 | Ostermann et al. |
| 4,687,793 A | 8/1987 | Motegi et al. |
| 4,708,623 A | 11/1987 | Aoki et al. |
| 4,717,742 A | 1/1988 | Beshay |
| 4,734,236 A | 3/1988 | Davis |
| 4,737,532 A | 4/1988 | Fujita et al. |
| 4,744,930 A | 5/1988 | Twist et al. |
| 4,746,688 A | 5/1988 | Bistak et al. |
| 4,769,109 A | 9/1988 | Tellvik et al. |
| 4,769,274 A | 9/1988 | Tellvik et al. |
| 4,783,493 A | 11/1988 | Motegi et al. |
| 4,789,604 A | 12/1988 | van der Hoeven |
| 4,790,966 A | 12/1988 | Sandberg et al. |
| 4,791,020 A | 12/1988 | Kokta |
| 4,800,214 A | 1/1989 | Waki et al. |
| 4,801,495 A | 1/1989 | van der Hoeven |
| 4,818,590 A | 4/1989 | Prince et al. |
| 4,818,604 A | 4/1989 | Tock |
| 4,820,749 A | 4/1989 | Beshay |
| 4,833,194 A | 5/1989 | Kuan et al. |
| 4,844,766 A | 7/1989 | Held |
| 4,851,458 A | 7/1989 | Hopperdietzel |
| 4,865,788 A | 9/1989 | Davis |
| 4,889,673 A | 12/1989 | Takimoto |
| 4,894,192 A | 1/1990 | Warych |
| 4,915,764 A | 4/1990 | Miani |
| 4,927,572 A | 5/1990 | van der Hoeven |
| 4,927,579 A | 5/1990 | Moore |
| 4,935,182 A | 6/1990 | Ehner et al. |
| 4,960,548 A | 10/1990 | Ikeda et al. |
| 4,968,463 A | 11/1990 | Levasseur |
| 4,973,440 A | 11/1990 | Tamura et al. |
| 4,978,489 A | 12/1990 | Radvan et al. |
| 4,988,478 A | 1/1991 | Held |
| 5,002,713 A | 3/1991 | Palardy et al. |
| 5,008,310 A | 4/1991 | Beshay |
| 5,009,586 A | 4/1991 | Pallmann |
| 5,049,334 A | 9/1991 | Bach |
| 5,055,247 A | 10/1991 | Ueda et al. |
| 5,057,167 A | 10/1991 | Gersbeck |
| 5,064,592 A | 11/1991 | Ueda et al. |
| 5,075,057 A | 12/1991 | Hoedl |
| 5,075,359 A | 12/1991 | Castagna et al. |
| 5,078,937 A | 1/1992 | Eela |
| 5,082,605 A | 1/1992 | Brooks et al. |
| 5,087,400 A | 2/1992 | Theuveny |
| 5,088,910 A | 2/1992 | Goforth et al. |
| 5,091,436 A | 2/1992 | Frisch et al. |
| 5,096,046 A | 3/1992 | Goforth et al. |
| 5,096,406 A | 3/1992 | Brooks et al. |
| 5,110,663 A | 5/1992 | Nishiyama et al. |
| 5,110,843 A | 5/1992 | Bries et al. |
| 5,120,776 A | 6/1992 | Raj et al. |
| 5,145,891 A | 9/1992 | Yasukawa et al. |
| 5,151,238 A | 9/1992 | Earl et al. |
| 5,153,241 A | 10/1992 | Beshay |
| 5,160,784 A | 11/1992 | Shmidt et al. |
| 5,165,941 A | 11/1992 | Hawley |
| 5,194,461 A | 3/1993 | Bergquist et al. |
| 5,218,807 A | 6/1993 | Fulford |
| 5,219,634 A | 6/1993 | Aufderhaar |
| 5,234,652 A | 8/1993 | Woodhams et al. |
| 5,258,232 A | 11/1993 | Summers et al. |
| 5,272,000 A | 12/1993 | Chenoweth et al. |
| 5,276,082 A | 1/1994 | Forry et al. |
| 5,284,710 A | 2/1994 | Hartley et al. |
| 5,288,772 A | 2/1994 | Hon |
| 5,302,634 A | 4/1994 | Mushovic |
| 5,318,737 A * | 6/1994 | Trabert et al. ............ 264/173.16 |
| 5,356,697 A | 10/1994 | Jonas |
| 5,369,147 A | 11/1994 | Mushovic |
| 5,387,381 A | 2/1995 | Saloom |
| 5,393,536 A | 2/1995 | Brandt et al. |
| 5,406,768 A | 4/1995 | Giuseppe et al. |
| 5,413,745 A | 5/1995 | Andersson |
| 5,422,170 A | 6/1995 | Iwata et al. |
| 5,423,933 A | 6/1995 | Horian |
| 5,435,954 A | 7/1995 | Wold |
| 5,441,801 A | 8/1995 | Deaner et al. |
| 5,443,887 A | 8/1995 | Nakao |
| 5,458,834 A | 10/1995 | Faber et al. |
| 5,474,722 A | 12/1995 | Woodhams |
| 5,480,602 A | 1/1996 | Nagaich |
| 5,486,553 A | 1/1996 | Deaner et al. |
| 5,497,594 A | 3/1996 | Giuseppe et al. |
| 5,505,900 A | 4/1996 | Suwanda et al. |
| 5,516,472 A | 5/1996 | Laver |
| 5,518,677 A | 5/1996 | Deaner et al. |
| 5,532,065 A | 7/1996 | Gubitz et al. |
| 5,537,789 A | 7/1996 | Minke et al. |
| 5,538,777 A | 7/1996 | Pauley et al. |
| 5,539,027 A | 7/1996 | Deaner et al. |
| 5,574,094 A | 11/1996 | Malucelli et al. |
| 5,576,374 A | 11/1996 | Betso et al. |
| 5,585,155 A | 12/1996 | Heikkila et al. |
| 5,593,625 A | 1/1997 | Riebel et al. |

| | | | | | | |
|---|---|---|---|---|---|---|
| 5,616,350 | A | 4/1997 | Wissmann et al. | 6,448,307 B1 | 9/2002 | Medoff et al. |
| 5,624,616 | A | 4/1997 | Brooks | 6,453,630 B1 | 9/2002 | Buhrts et al. |
| 5,695,874 | A | 12/1997 | Deaner et al. | 6,464,913 B1 | 10/2002 | Korney, Jr. |
| 5,711,349 | A | 1/1998 | Wissmann | 6,498,205 B1 | 12/2002 | Zehner |
| 5,725,939 | A | 3/1998 | Nishibori | 6,511,757 B1 | 1/2003 | Brandt et al. |
| 5,735,092 | A | 4/1998 | Clayton et al. | 6,531,010 B2 | 3/2003 | Puppin |
| 5,744,210 | A | 4/1998 | Hofmann et al. | 6,569,540 B1 | 5/2003 | Preston et al. |
| 5,759,680 | A | 6/1998 | Brooks et al. | 6,578,368 B1 | 6/2003 | Brandt et al. |
| 5,773,138 | A | 6/1998 | Seethamraju et al. | 6,579,605 B2 | 6/2003 | Zehner |
| 5,776,841 | A | 7/1998 | Bondoc et al. | 6,590,004 B1 | 7/2003 | Zehner |
| 5,783,125 | A | 7/1998 | Bastone et al. | 6,605,245 B1 | 8/2003 | Dubelsten et al. |
| 5,795,641 | A | 8/1998 | Pauley et al. | 6,617,376 B2 | 9/2003 | Korney, Jr. |
| 5,807,514 | A | 9/1998 | Grinshpun et al. | 6,632,863 B2 | 10/2003 | Hutchison et al. |
| 5,827,462 | A | 10/1998 | Brandt et al. | 6,637,213 B2 | 10/2003 | Hutchison et al. |
| 5,827,607 | A | 10/1998 | Deaner et al. | 6,641,384 B2 | 11/2003 | Bosler et al. |
| 5,836,128 | A | 11/1998 | Groh et al. | 6,662,515 B2 | 12/2003 | Buhrts et al. |
| 5,847,016 | A | 12/1998 | Cope | 6,680,090 B2 | 1/2004 | Godavarti et al. |
| 5,851,469 | A | 12/1998 | Muller et al. | 6,682,789 B2 | 1/2004 | Godavarti et al. |
| 5,858,522 | A | 1/1999 | Turk et al. | 6,682,814 B2 | 1/2004 | Hendrickson et al. |
| 5,863,064 | A | 1/1999 | Rheinlander et al. | 6,685,858 B2 | 2/2004 | Korney, Jr. |
| 5,863,480 | A | 1/1999 | Suwanda | 6,708,504 B2 | 3/2004 | Brandt et al. |
| 5,866,054 | A | 2/1999 | Dorchester et al. | 6,716,522 B2 | 4/2004 | Matsumoto et al. |
| 5,866,264 | A | 2/1999 | Zehner et al. | 6,752,941 B2 * | 6/2004 | Hills ............................. 264/75 |
| 5,869,138 | A | 2/1999 | Nishibori | 6,773,255 B2 | 8/2004 | Benz et al. |
| 5,869,176 | A | 2/1999 | Dorchester et al. | 6,780,359 B1 | 8/2004 | Zehner et al. |
| 5,882,564 | A | 3/1999 | Puppin | 6,784,216 B1 | 8/2004 | Zehner et al. |
| 5,910,358 | A | 6/1999 | Thoen et al. | 6,784,230 B1 | 8/2004 | Patterson et al. |
| 5,932,334 | A | 8/1999 | Deaner et al. | 6,793,474 B2 | 9/2004 | Gröeblacher et al. |
| 5,948,505 | A | 9/1999 | Puppin | 6,844,049 B2 | 1/2005 | Amin-Javaheri |
| 5,948,524 | A | 9/1999 | Seethamraju et al. | 6,863,972 B2 | 3/2005 | Burger et al. |
| 5,951,927 | A | 9/1999 | Cope | 6,939,496 B2 | 9/2005 | Maine et al. |
| 5,965,075 | A | 10/1999 | Pauley et al. | 6,958,185 B1 | 10/2005 | Zehner |
| 5,981,067 | A | 11/1999 | Seethamraju et al. | 6,971,211 B1 | 12/2005 | Zehner |
| 5,985,429 | A | 11/1999 | Plummer et al. | 6,984,676 B1 | 1/2006 | Brandt |
| 6,004,652 | A | 12/1999 | Clark | 7,017,352 B2 | 3/2006 | Hutchison et al. |
| 6,004,668 | A | 12/1999 | Deaner et al. | 7,030,179 B2 | 4/2006 | Patterson et al. |
| 6,007,656 | A | 12/1999 | Heikkila et al. | 7,037,865 B1 | 5/2006 | Kimberly |
| 6,011,091 | A | 1/2000 | Zehner | 7,186,457 B1 | 3/2007 | Zehner et al. |
| 6,015,611 | A | 1/2000 | Deaner et al. | 7,378,462 B1 * | 5/2008 | Hughes et al. .................. 524/13 |
| 6,015,612 | A | 1/2000 | Deaner et al. | 7,445,840 B2 * | 11/2008 | Moriya et al. ............. 428/319.3 |
| 6,035,588 | A | 3/2000 | Zehner et al. | 7,743,567 B1 | 6/2010 | Buhrts |
| 6,044,604 | A | 4/2000 | Clayton et al. | 2001/0019749 A1 | 9/2001 | Godavarti et al. |
| 6,054,207 | A | 4/2000 | Finley | 2001/0051242 A1 | 12/2001 | Godavarti et al. |
| 6,066,367 | A | 5/2000 | Nishibori | 2001/0051243 A1 | 12/2001 | Godavarti et al. |
| 6,066,680 | A | 5/2000 | Cope | 2002/0015820 A1 | 2/2002 | Puppin |
| 6,083,601 | A | 7/2000 | Prince et al. | 2002/0038684 A1 | 4/2002 | Puppin |
| 6,103,791 | A | 8/2000 | Zehner | 2002/0040557 A1 | 4/2002 | Felton |
| 6,106,944 | A | 8/2000 | Heikkila et al. | 2002/0066248 A1 | 6/2002 | Buhrts et al. |
| 6,114,008 | A | 9/2000 | Eby et al. | 2002/0090471 A1 | 7/2002 | Burger et al. |
| 6,117,924 | A | 9/2000 | Brandt | 2002/0092256 A1 | 7/2002 | Hendrickson et al. |
| 6,122,877 | A | 9/2000 | Hendrickson et al. | 2002/0106498 A1 | 8/2002 | Deaner et al. |
| 6,131,355 | A | 10/2000 | Groh et al. | 2002/0143083 A1 | 10/2002 | Korney, Jr. |
| 6,133,348 | A | 10/2000 | Kolla et al. | 2002/0161072 A1 | 10/2002 | Jacoby et al. |
| 6,153,293 | A | 11/2000 | Dahl et al. | 2002/0166327 A1 | 11/2002 | Brandt et al. |
| 6,161,353 | A | 12/2000 | Negola et al. | 2002/0174663 A1 | 11/2002 | Hutchison et al. |
| 6,180,211 | B1 | 1/2001 | Held | 2002/0192401 A1 | 12/2002 | Matsumoto et al. |
| 6,180,257 | B1 | 1/2001 | Brandt et al. | 2002/0192431 A1 | 12/2002 | Edgman |
| 6,207,729 | B1 | 3/2001 | Medoff et al. | 2003/0021915 A1 | 1/2003 | Rohatgi et al. |
| 6,210,616 | B1 | 4/2001 | Suwanda | 2003/0025233 A1 | 2/2003 | Korney, Jr. |
| 6,210,792 | B1 | 4/2001 | Seethamraju et al. | 2003/0050378 A1 | 3/2003 | Blanchard et al. |
| 6,248,813 | B1 | 6/2001 | Zehner | 2003/0087994 A1 | 5/2003 | Frechette |
| 6,265,037 | B1 | 7/2001 | Godavarti et al. | 2003/0087996 A1 | 5/2003 | Hutchison et al. |
| 6,272,808 | B1 | 8/2001 | Groh et al. | 2003/0096094 A1 * | 5/2003 | Hayduke .................... 428/292.4 |
| 6,280,667 | B1 | 8/2001 | Koenig et al. | 2003/0154662 A1 | 8/2003 | Bruchu et al. |
| 6,284,098 | B1 | 9/2001 | Jacobsen | 2003/0176538 A1 | 9/2003 | Wu et al. |
| 6,295,777 | B1 | 10/2001 | Hunter et al. | 2003/0229160 A1 | 12/2003 | Williams et al. |
| 6,295,778 | B1 | 10/2001 | Burt | 2004/0026021 A1 | 2/2004 | Groh et al. |
| 6,337,138 | B1 | 1/2002 | Zehner et al. | 2004/0038002 A1 | 2/2004 | Franco et al. |
| 6,341,458 | B1 | 1/2002 | Burt | 2004/0048055 A1 | 3/2004 | Branca |
| 6,342,172 | B1 | 1/2002 | Finley | 2004/0071964 A1 | 4/2004 | Nesbitt |
| 6,344,268 | B1 | 2/2002 | Stucky et al. | 2004/0142157 A1 | 7/2004 | Melkonian |
| 6,344,504 | B1 | 2/2002 | Zehner et al. | 2004/0147625 A1 | 7/2004 | Dostal et al. |
| 6,346,160 | B1 | 2/2002 | Puppin | 2004/0148965 A1 | 8/2004 | Hutchison et al. |
| 6,357,197 | B1 | 3/2002 | Serino et al. | 2004/0191494 A1 | 9/2004 | Nesbitt |
| 6,358,585 | B1 | 3/2002 | Wolff | 2004/0192794 A1 | 9/2004 | Patterson et al. |
| 6,360,508 | B1 | 3/2002 | Pelfrey et al. | 2004/0219357 A1 | 11/2004 | Van Dijk et al. |
| 6,362,252 | B1 | 3/2002 | Prutkin | 2004/0220299 A1 | 11/2004 | Drabeck, Jr. et al. |
| 6,409,952 | B1 | 6/2002 | Hacker et al. | 2005/0009960 A1 | 1/2005 | Ton-That et al. |
| 6,423,257 | B1 | 7/2002 | Stobart et al. | 2005/0013984 A1 | 1/2005 | Dijk et al. |

| | | | |
|---|---|---|---|
| 2005/0067729 A1 | 3/2005 | Laver et al. | |
| 2005/0154094 A1 | 7/2005 | Maeda et al. | |
| 2005/0163969 A1 | 7/2005 | Brown | |
| 2005/0171246 A1 | 8/2005 | Maine et al. | |
| 2005/0192382 A1 | 9/2005 | Maine et al. | |
| 2005/0266222 A1 | 12/2005 | Clark et al. | |
| 2005/0271872 A1 | 12/2005 | Dolinar | |
| 2005/0271889 A1 | 12/2005 | Dolinar | |
| 2006/0010883 A1 | 1/2006 | Hutchison et al. | |
| 2006/0010884 A1 | 1/2006 | Hutchison et al. | |
| 2006/0012066 A1 | 1/2006 | Hutchison et al. | |
| 2006/0012071 A1 | 1/2006 | Groh et al. | |
| 2006/0022372 A1 | 2/2006 | Matuana et al. | |
| 2006/0057348 A1 | 3/2006 | Maine et al. | |
| 2006/0068053 A1 | 3/2006 | Brandt et al. | |
| 2006/0068215 A2 | 3/2006 | Dolinar | |
| 2006/0269738 A1 | 11/2006 | Kimberly | |
| 2007/0052124 A1 | 3/2007 | Park et al. | |
| 2007/0235705 A1 | 10/2007 | Burger et al. | |
| 2007/0296112 A1 | 12/2007 | Brandt et al. | |
| 2008/0093763 A1 | 4/2008 | Mancosh et al. | |
| 2008/0197523 A1 | 8/2008 | Heigel et al. | |
| 2009/0264560 A1 | 10/2009 | Warnes et al. | |

FOREIGN PATENT DOCUMENTS

| | | |
|---|---|---|
| CL | 343-95 | 3/1995 |
| CL | 3037-99 | 12/1999 |
| DE | 2042176 | 4/1971 |
| DE | 3801574 A1 | 8/1989 |
| DE | 4033849 A1 | 4/1991 |
| DE | 4221070 A1 | 12/1993 |
| DK | 140148 B | 6/1979 |
| EP | 0269470 A2 | 1/1988 |
| EP | 0586211 A1 | 3/1994 |
| EP | 0586212 A2 | 3/1994 |
| EP | 0586213 A1 | 3/1994 |
| EP | 0668142 A1 | 8/1995 |
| EP | 0747419 A2 | 12/1996 |
| FR | 2270311 A1 | 12/1975 |
| FR | 2365017 A1 | 4/1978 |
| FR | 2445885 A1 | 8/1980 |
| FR | 2564374 A1 | 11/1985 |
| GB | 1298823 | 12/1972 |
| GB | 1443194 | 7/1976 |
| GB | 2036148 A | 6/1980 |
| GB | 2104903 A | 3/1983 |
| GB | 2171953 A | 9/1986 |
| GB | 2186655 A | 8/1987 |
| JP | 57-190035 A | 11/1982 |
| JP | 2000-17245 A | 1/2000 |
| JP | 2000-109589 A | 4/2000 |
| JP | 2002-86544 A | 3/2002 |
| JP | 2002-113768 A | 4/2002 |
| JP | 2002-137333 A | 5/2002 |
| JP | 2002-144489 A | 5/2002 |
| WO | 90/08020 A1 | 7/1990 |
| WO | 95/13179 A1 | 5/1995 |
| WO | 99/11444 A1 | 3/1999 |
| WO | 00/11282 A2 | 3/2000 |
| WO | 00/34017 A1 | 6/2000 |
| WO | 00/39207 A1 | 7/2000 |
| WO | 01/66873 A1 | 9/2001 |
| WO | 02/057692 A2 | 7/2002 |
| WO | 02/079317 A1 | 10/2002 |
| WO | 02/103113 A2 | 12/2002 |
| WO | 03/091642 A1 | 11/2003 |
| WO | 2004/083541 A2 | 9/2004 |
| WO | 2004/083541 A3 | 11/2004 |
| WO | 2004/102092 A1 | 11/2004 |
| WO | 2006/041508 A2 | 4/2006 |
| WO | 2006/071517 A2 | 7/2006 |
| WO | 2007/085836 A1 | 8/2007 |

OTHER PUBLICATIONS

Bendtsen et al., Chapter 4: Mechanical Properties of Wood, USDA Ag. Hdbk. #72, Wood Handbook: Wood as an Engineering Material, Madison, WI, pp. 4-2 to 4-44 (1987).
Bibliography of Solid Phase Extrusion, pp. 187-195.
Brzoskowski et al., Air-Lubricated Die for Extrusion of Rubber Compounds, Rubber Chemistry and Technology, vol. 60, p. 945-956 (1987).
Campbell et al., The Reinforcement of Thermoplastic Elastomers With Santoweb® Fibre, Short Fibre Reinforced Thermoplastics, pp. 14/1-14/10.
Collier et al., High Strength Extrudates by Melt Transformation Coextrusion, ANTEC, 1987, pp. 497-502.
Collier et al., Streamlined Dies and Profile Extrusion, ANTEC, 1987, pp. 203-206.
Company News, Plastics Industry News, May 1994, pp. 70-71.
Dalvag et al., The Efficiency of Cellulosic Fillers in Common Thermoplastics. Part II. Filling with Processing Aids and Coupling Agents, 1985, vol. 11, pp. 9-38.
Doroudiani et al., Structure and Mechanical Properties Study of Foamed Wood Fiber/Polyethylene Composites, ANTEC, 1997, pp. 2046-2050.
EIN Engineering Inc., Making Wood From Waste Wood and Waste Plastic Using EIN Technology, EIN Plastic & Wood Recycling System Catalog, 1999, 16 pages.
EIN Engineering Inc., Wood-like Material Superior to Real Wood, 5 pages.
English et al., Wastewood-Derived Fillers for Plastics, The Fourth International Conference on Woodfiber-Plastic Composites, 1997, pp. 309-324.
Fiberloc Polymer Composites, B.F. Goodrich, Geon Vinyl Division, section 1, pp. 2-15 (1986).
Fill Thermoplastics with Wood, Modern Plastics, May 1974, pp. 54-55.
Fillers for Thermoplastics: Beyond Resin Stretching, Modern Plastics International, Oct. 1976, pp. 12-15.
From Sweden: Extruded Interior Trim Made of PVC and Wood Fluor, Plastic Building Construction, vol. 9 No. 5, 1986, pp. 5-6.
Forest Products Laboratory, Wood Handbook: Wood as an Engineering Material, Agriculture Handbook 72, United States Department of Agriculture Forest Service, 1974, 2 pages.
Gatenholm et al., The Effect of Chemical Composition of Interphase on Dispersion of Cellulose Fibers in Polymers. I. PVC-Coated Cellulose in Polystyrene, Journal of Applied Polymer Science, vol. 49, 1993, pp. 197-208.
Henrici-Olive et al., Integral/Structural Polymer Foams: Technology, Properties and Applications, Springer Verlag, pp. 111-122 (1986).
Klason et al., The Efficiency of Cellulosic Fillers in Common Thermoplastics. Part 1. Filling without Processing Aids or Coupling Agents, Polymeric Materials, 1984, vol. 10, pp. 159-187.
Kokta et al., Composites of Poly(Vinyl Chloride) and Wood Fibers. Part II: Effect of Chemical Treatment, Polymer Composites, Apr. 1990, pp. 84-89.
Kokta et al., Composites of Polyvinyl Chloride—Wood Fibers. I. Effect of Isocyanate as a Bonding Agent, Polym.—Plast. Technol. Eng., 1990, 29(1&2), pp. 87-118.
Kokta et al., Composites of Polyvinyl Chloride—Wood Fibers. III: Effect of Silane as Coupling Agent, Journal of Vinyl Technology, Sep. 1990, pp. 146-153.
Kokta et al., "Use of Grafted Wood Fibers in Thermoplastic Composites v. Polystyrene", Centre de recherche en pâtes et papiers, Université du Québec à Trois-Rivières, Canada (1986).
Kokta et al., Use of Wood Fibers in Thermoplastic Composites, Polymer Composites, Oct. 1983, pp. 229-232.
Kowalska et al., Modification of Recyclates of Polyethylene and Poly(Vinyl Chloride) with Scrap Paper Cellulose Fibres, Polymer Recycling, vol. 6, Nos. 2/3, 2001, pp. 109-118.
Lightsey, Organic Fillers for Thermoplastics, Polymer Science and Technology, vol. 17, Aug. 1981, pp. 193-211.
Maldas et al., Composites of Polyvinyl Chloride—Wood Fibers: IV. Effect of the Nature of Fibers, Journal of Vinyl Technology, Jun. 1989, pp. 90-98.
Maldas et al., Improving Adhesion of Wood Fiber with Polystyrene by the Chemical Treatment of Fiber with a Coupling Agent and the Influence on the Mechanical Properties of Composites, Journal of Adhesion Science Technology, vol. 3 No. 7, pp. 529-539 (1989).
Maloney, Modern Particleboard & Dry-Process Fiberboard Manufacturing, Miller Freeman Publications, 1977, 6 pages.

Myers et al., "Wood flour and polypropylene or high-density polyethylene composites: influence of maleated polypropylene concentration and extrusion temperature on properties", Forest Products Society, Wood Fiber/Polymer Composites: Fundamental Concepts, Processes, and Material Options, Madison, WI, pp. 49-56 (1993).

Myers et al., Bibliography: Composites from Plastics and Wood-Based Fillers, USDA Forest Products Laboratory, Madison, WI, pp. 1-27 odds (1991).

Myers et al., Effects of Composition and Polypropylene Melt Flow on Polypropylene—Waste Newspaper Composites, ANTEC, 1992, pp. 602-604.

Panshin et al., Forest Products, Wood Flour, Chapter 11, 1950, pp. 232-239.

Pornnimit et al., Extrusion of Self-Reinforced Polyethylene, Advances in Polymer Technology, vol. 11, No. 2, pp. 92-98 (1992).

Raj et al., The Influence of Coupling Agents on Mechanical Properties of Composites Containing Cellulose Fillers, Marcel Dekker, Inc., 1990, pp. 339-353.

Raj et al., Use of Wood Fiber as Filler in Common Thermoplastics: Studies on Mechanical Properties, Science and Engineering of Composite Materials, vol. 1 No. 3, 1989, pp. 85-98.

Raj et al., Use of Wood Fibers in Thermoplastics. VII. The Effect of Coupling Agents in Polyethylene—Wood Fiber Composites, Journal of Applied Polymer Science, vol. 37, pp. 1089-1103 (1989).

Redbook, For Resin Producers, Formulators, and Compounders, Plastics Compounding, 1992/93, 2 pages.

Reineke, Wood Flour, U.S. Department of Agriculture Forest Service, U.S. Forest Service Research Note FPL-0113, Jan. 1966, 7 pages.

Resin Stretching: Accent on Performance, Modern Plastic International, Jan. 1974, pp. 58-60.

Robson et al., A Comparison of Wood and Plant Fiber Properties, Proceedings: Woodfiber-Plastic Composites, 1995, pp. 41-46.

Rogalski et al., Poly(Vinyl-Chloride) Wood Fiber Composites, ANTEC, 1987, pp. 1436-1441.

Royal Group Technologies, Inc., New Composite Building Material Adds the Right Mix of Beauty and Brawn to Upscale Homes, www.royalgrouptech.com, printed Aug. 18, 2005, 3 pages.

Schneider et al., Biofibers as Reinforcing Fillers in Thermoplastic Composites, ANTEC, 1994, pp. 6 pages.

Schut, Compatibilizing Mixed Post-Consumer Plastics, Plastics Formulating & Compounding, Mar./Apr. 1997, pp. 43.

Simonsen et al., Wood-Fiber Reinforcement of Styrene-Maleic Anhydride Copolymers, J. Appl. Polm. Sci. 68, No. 10, Jun. 6, 1998, pp. 1567-1573.

Sonwood Outline, Sonesson Plast AB, Apr. 1975.

Sonwood: a new PVC wood-flour alloy for Extrusions and other Plastic Processing Techniques, Sonesson Plast AB, Malmo, Sweden (1975).

Stark et al., Effect of Particle Size on Properties of Wood-Flour Reinforced Polypropylene Composites, The Fourth International Conference on Woodfiber-Plastic Composites, 1997, pp. 134-143.

Stark et al., Photostabilization of Wood Flour Filled Hdpe Composites, ANTEC, May 5-9, 2002, pp. 2209-2013.

Stark, Wood Fiber Derived From Scrap Pallets Used in Polypropylene Composites, Forest Products Journal, vol. 49, No. 6, Jun. 1999, pp. 39-46.

Suchsland et al., Fiberboard Manufacturing Practices in the United States, Agriculture Handbook No. 640, United States Department of Agriculture Forest Service, 1986, 4 pages.

Thomas et al., Wood Fibers for Reinforcing Fillers for Polyolefins, ANTEC, 1984, pp. 687-689.

Wood Filled PVC, Plastics Industry News, Jul. 1996, p. 6.

Woodhams et al., Wood Fibers for Reinforcing Fillers for Polyolefins, Polymer Engineering and Science, Oct. 1984, pp. 1166-1171.

Yam et al., Composites from Compounding Wood Fibers With Recycled High Density Polyethylene, Polymer Engineering and Science, mid-Jun. 1990, pp. 693-699, vol. 30, No. 11.

Yuskova et al., Interaction of Components in Poly(Vinyl Chloride) Filled in Polymerization, Makroniol Chem., Macromol. Symp. 29, 315-320 (1989).

Zadorecki et al., Future Prospects for Wood Cellulose as Reinforcement in Organic Polymer Composites, Polymer Composites, Apr. 1989, pp. 69-77.

W.L. Gore & Associates, Inc. V. Garlock, Inc., 721 F.2d 1540, 1553, 220 USPQ 303, 312-13 (Fed. Cir. 1983), cert denied, 469 U.S. 851 (1984), 18 pages.

* cited by examiner

CAPPED COMPONENT AND METHOD FOR FORMING

This application is a continuation of U.S. patent application Ser. No. 11/935,217, filed Nov. 5, 2007, which is hereby incorporated by reference in its entirety. This application is also a continuation-in-part of U.S. application Ser. No. 11/967,434, filed Dec. 31, 2007, which claims priority to U.S. Provisional Application No. 60/882,869, filed Dec. 29, 2006, each of which is hereby incorporated by reference in its entirety.

BACKGROUND AND SUMMARY OF THE INVENTION

Exemplary embodiments of the present invention relate generally to a method of manufacturing a component having a cap layer. More specifically, some exemplary embodiments relate to a method of manufacturing a cellulosic composite component having a substrate and a cap layer.

A problem with the use of wood materials in structural applications is the lack of durability and the degradation in appearance when exposed to the environment. In the example of exposed railing systems, such as those commonly found about the perimeter of residential decks, rain can infiltrate the tops of posts and the other exposed surfaces of the wood components, which may eventually cause rot and the loss of a pleasing aesthetic appearance. Traditional wood surface treatments, such as paint or lacquers, have limited life and require routine maintenance, which can result in significant expense over time. Additionally, wood railing systems, for example, are typically custom-built on-site, thereby requiring significant amounts of labor to custom-cut and install individual components. Consequently, there is a need for materials that are weather resistant and can be formed into structural components, such as exterior rail systems as an example.

Exemplary embodiments of the present invention may address some or all of these deficiencies by employing composite materials to make a component. An exemplary component of the present invention may be comprised of a cap layer that is placed over a composite substrate. This combination of a cap layer and composite substrate may provide multiple advantages. In particular, this combination enables the use of a relatively low cost, composite material as a substrate that provides desired structural characteristics for the component, even though the composite material may not have desirable aesthetic characteristics. An exemplary embodiment of the cap layer may include streaker and cellulosic filler. The cap layer may be applied on the composite substrate to provide an attractive and protective finish for the component. Furthermore, the cap layer may reduce manufacturing costs by not requiring a streaker to be applied throughout the entire substrate. As a result of such benefits, an exemplary embodiment of the component may be resistant to weathering and may be used for railing, siding, or other similar or suitable indoor or outdoor products.

In one exemplary embodiment, the cap layer may include a blend of polyvinyl chloride (PVC) and acrylic and may exhibit an improved resistance to degradation, which may be caused by UV light exposure or other environmental factors. In another exemplary embodiment, a component may be made from a plastic material comprising acrylic-styrene-acrylonitrile (ASA), which may also exhibit an improved resistance to degradation, such as may be caused by environmental factors. In yet another exemplary embodiment, the cap layer may be a polyolefin-based material that has enhanced resistance to degradation and scratching. In still another exemplary embodiment, the cap layer may include a cellulosic material and/or a streaker material.

An example of a method for forming such aforementioned components may include providing an extrusion system having at least one extruder and at least one die system. The method may also include providing a substrate material and a cap layer material. Exemplary embodiments of the method may include extruding the substrate material and co-extruding the cap layer material onto at least a portion of the substrate material. In certain exemplary embodiments, the method may further include forming a flow from the substrate material and cap layer material, and forcing the flow through the die system to form at least one component. Furthermore, in some exemplary embodiments, multiple components may be simultaneously produced from the same tooling.

In addition to the novel features and advantages mentioned above, other features and advantages will be readily apparent from the following descriptions of the drawings and exemplary embodiments.

DETAILED DESCRIPTION OF EXEMPLARY EMBODIMENT(S)

Figure 1:
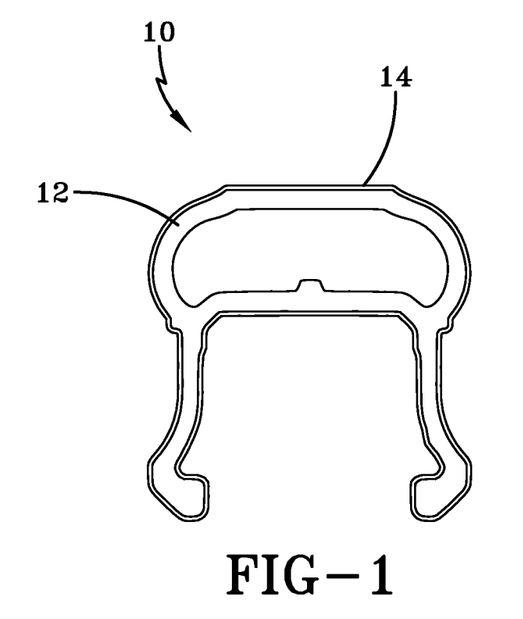
FIG. 1 is a cross-sectional view of an exemplary embodiment of a rail of the present invention.

FIG. 1 illustrates an example of a component of the present invention. In this example, a handrail 10 is comprised of a composite substrate 12 and a cap layer 14. The handrail 10 may, for example, be useful for a deck railing system or other similar or suitable types of railing.

Figure 2:
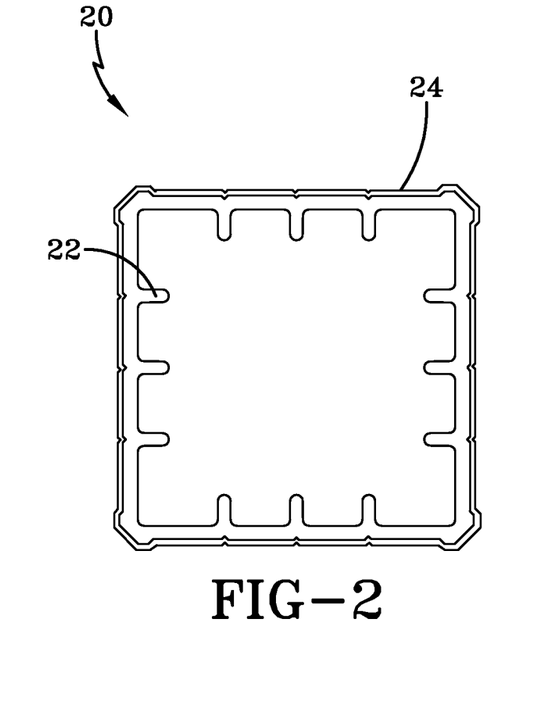
FIG. 2 is a cross-sectional view of an exemplary embodiment of a post cover of the present invention.

Another exemplary component of the present invention is illustrated in FIG. 2. FIG. 2 shows an exemplary post cover 20 that also comprises a composite substrate 22 and a cap layer 24. Such a cover may be installed, for example, over an existing wood post to provide an aesthetically pleasing appearance as well as to provide protection from exposure to the elements.

Figure 3:
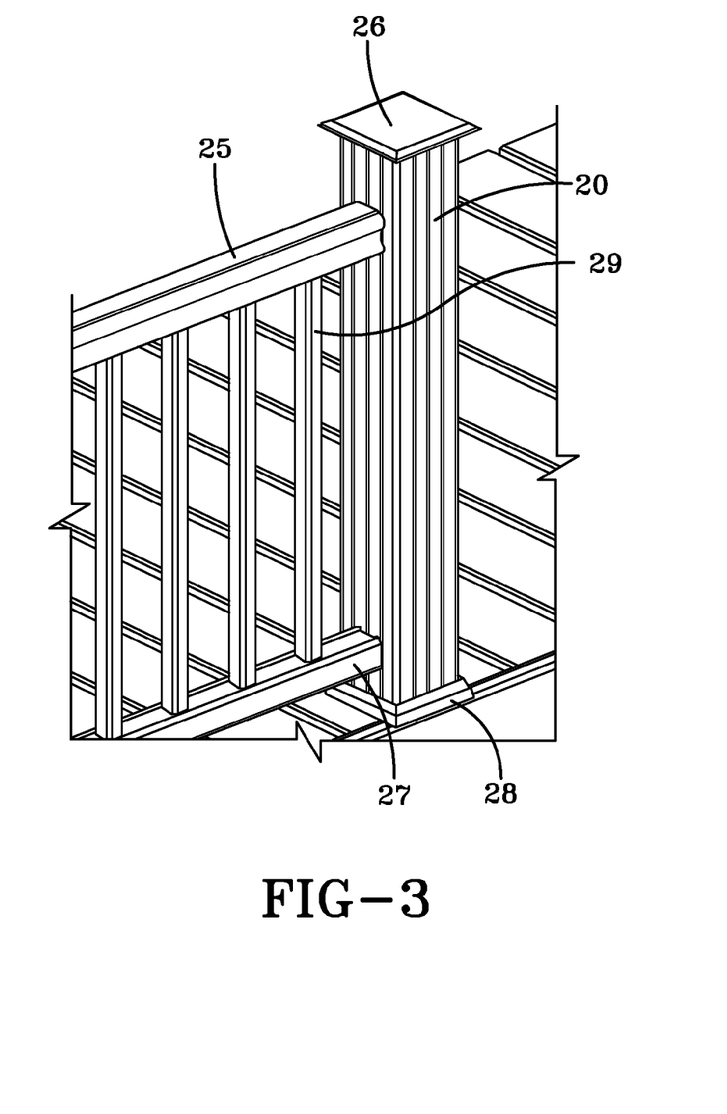
FIG. 3 is a perspective view of an example of a railing system that may utilize components made by an exemplary embodiment of the present invention.

FIG. 3 shows an example of a railing system that may utilize the components shown in FIGS. 1 and 2. In particular, rail 25 and rail 27 may be connected to post cover 20 at a variety of horizontal and vertical angles, such as for deck and stair applications. Post covers 20 may be installed over pre-installed posts from which they derive structural rigidity and strength. Nevertheless, it should be recognized that the railing may utilize a post without the benefit of the post cover components. It should be noted that in this exemplary embodiment, any or all of the components may be fabricated as described above to provide a durable, weather-resistant, and aesthetically pleasing railing system.

Exemplary embodiments of the present invention may also be useful for making other types of railing components including, but not limited to, spindles, squash blocks, support rails, and posts. Nevertheless, while exemplary embodiments of the present invention may be particularly useful for making railing components, it should be recognized that they may also be useful for manufacturing other types of indoor and outdoor components. Examples of components that can be made with the present invention include, but are not limited to, fence components, furniture components, cabinet components, storage device components, lawn edging components, flower box components, floor components, baseboards, roof components, wall covering components, building siding components, basement floor components, basement wall covering components, interior and exterior decorative house molding components, crown molding components, chair rail components, picture frame components, porch deck components, deck railing components, window molding components, window components, window frames, door components, door frames, door moldings, posts, boards (e.g., 5/4-inch boards, 2 inch×6 inch boards, and other desired sizes of boards), and other suitable indoor and outdoor items. Furthermore, it should be recognized that the component may be solid or hollow.

In exemplary embodiments of the present invention, the substrate may be comprised of a composite that has a high cellulosic content. For instance, one exemplary embodiment of the composite is comprised of cellulosic material in the amount of at least about 30% by weight, more preferably about 30% to about 70% by weight (e.g., about 60% by weight), and even more preferably about 40% to about 60% by weight. A plastic material may be included in an amount of about 0.01% to about 70% by weight, more preferably about 30% to about 70% by weight, and still more preferably about 30% to about 60% by weight (e.g., about 40% by weight). For another example, the composite may be comprised of cellulosic material in an amount of about 55% by weight and a plastic material in an amount of about 30% to about 45% by weight. In yet another exemplary embodiment, the composite may be comprised of cellulosic material in the amount of about 50% by weight and a plastic material in an amount of about 50% by weight. In some exemplary embodiments, cellulosic material may be provided in an amount less than 50% by weight of the composite, and plastic material may be provided in an amount more than 50% by weight of the composite.

A high cellulosic content enables the cost-effective production of a substrate that has desirable structural characteristics. For example, the high cellulosic content promotes the desired durability, rigidity, flexibility, and other structural characteristics for a variety of types of components. For instance, the high cellulosic content enables the cost-effective production of railing components that exceed load-testing requirements.

The cellulosic material may be virgin or recycled. Examples of cellulosic material include sawdust, newspapers, alfalfa, wheat pulp, wood chips, wood fibers, wood particles, ground wood, wood flour, flax, wood flakes, wood veneers, wood laminates, paper, cardboard, straw, cotton, rice hulls, coconut shells, peanut shells, bagasse, plant fibers, bamboo fiber, palm fiber, kenaf, and other similar or suitable materials. Any of the wood examples may be hard or soft wood or variations thereof. Furthermore, any desired mesh size of the cellulosic material can be used. With regard to cellulosic material, an exemplary range of mesh size is about 10 to about 100 mesh, more preferably about 20 mesh to about 80 mesh depending on the desired characteristics of the composite. However, some exemplary embodiments may use other cellulosic materials of other sizes.

The cellulosic material may be dried to a desired moisture content prior to or during the formation of the substrate. For example, the cellulosic material may be dried to about 0.5% to about 3% moisture content by weight, more preferably to about 1% to about 2% moisture content by weight. However, it should be recognized that the cellulosic material may have a moisture content less than about 0.5% by weight or greater than about 3% by weight and still be within the scope of the present invention.

The plastic material may be comprised of virgin or recycled materials that may improve the characteristics of the reinforced composite and/or enhance the manufacture or moldability thereof. In addition, the plastic material may be foamable or foamed. In one exemplary embodiment of the present invention, the plastic material may be a PVC or polyethylene (PE) material, which enables the production of a component having structural characteristics suitable for railing or other applications. The PVC or PE material may, for example, be made by mixing PVC or PE resin with, optionally, at least one stabilizer, at least one lubricant, at least one process aid, and other optional ingredients (e.g., acrylic modifier, inorganic filler, and other suitable additives). Optionally, another plastic resin may also be included in the composite such as, but not limited to, acrylonitrile butadiene styrene (i.e., ABS) resin. An example of a mixer is a high intensity mixer such as those made by Littleford Day Inc. or Henschel Mixers America Inc. As an example, the mechanically induced friction may heat the ingredients to a temperature between about 200° F. and about 230° F. After mixing, the ingredients may be cooled to ambient temperature. Alternatively, the ingredients of the PVC or PE material may be mixed together during the formation of the substrate. Although PVC or PE may be preferred for some embodiments, it should be recognized that other plastics may be used in other exemplary embodiments of the present invention.

With reference to a plastic material that may comprise PVC or PE resin, one exemplary embodiment may include PVC or PE resin in an amount of about 20% to about 45% by weight of the composite, more preferably about 25% to about 40% by weight of the composite, and still more preferably about 27% to about 37% by weight of the composite. An exemplary embodiment of the plastic material may further include stabilizer(s) in an amount of about 1 to about 10 parts, more preferably about 2 to about 4 parts, per 100 parts of resin. In an example, lubricant(s) may be present in an amount of about 1 to about 40 parts, more preferably about 5 to about 35 parts, per 100 parts of resin. In one exemplary embodiment, lubricant(s) may be included in an amount of about 0.01% to about 10% by weight of the composite. Also, process aid(s) may be included in an exemplary embodiment in an amount of about 0.5 to about 8 parts, more preferably about 0.7 to about 3 parts, per 100 parts of resin. Optionally, in an exemplary embodiment, acrylic modifier(s) (e.g., impact modifiers) may be present in an amount of about 1 to about 10 parts, more preferably about 4 to about 8 parts, per 100 parts of resin. As a further option in an embodiment, inorganic filler(s) may be added in an amount of up to about 150 parts, more preferably about 2 to about 60 parts, per 100 parts of resin. In one example, inorganic filler(s) may be included in an amount of about 0.01% to 20% by weight of the composite, more preferably about 1% to about 20% by weight of the composite, and still more preferably about 5% to about 15% by weight of the composite. In addition, another plastic resin (e.g., ABS resin or any other similar or suitable resin) may be included in an exemplary embodiment in an amount up to about 50% by weight of the composite, more preferably about 5-10% by weight of the composite.

Stabilizer(s) may be employed to limit or prevent the breakdown of the plastic material during molding. Examples of stabilizers include tin stabilizers, lead and metal soaps such as barium, cadmium, and zinc, and other similar or suitable materials.

Internal or external lubricant(s) may aid in the molding process. Lubricants may be added to the plastic material to assist the reinforced composite through an extruder, compounder, or other molding machine, and to help facilitate mold release. Examples of lubricants include zinc stearate, calcium stearate, esters, amide wax, paraffin wax, ethylene bis-stearamide, and other similar or suitable materials.

Process aid(s) may aid in the fusion of the compound. Examples of process aids include acrylic process aids and other similar or suitable materials for improving the fusion of the compound. R&H K-120N and R&H K-175 are examples of acrylic process aids that are available from Rohm & Haas.

Acrylic modifier(s) may improve the physical characteristics of the compound. One example of an impact modifier is Arkema P530. Another example of an acrylic modifier is R&H K-400, which is available from Rohm & Haas. Although R&H K-400 is a high molecular weight acrylic modifier that is specifically designed for PVC or PE foam applications, the inventors have discovered that it may also improve the physical characteristics of the substrate of the present invention, which has a high cellulosic content and may not include any foaming or blowing agents.

Inorganic filler(s) may be used to increase the bulk density of the reinforced composite. The use of inorganic filler may also improve the ability to process the reinforced composite, thereby allowing for higher rates of manufacture (e.g., extrusion). Inorganic filler may also allow the reinforced composite to be molded into articles having reduced moisture sensitivity and reduced flame and smoke spread. Examples of inorganic fillers include talc, calcium carbonate, kaolin clay, magnesium oxide, titanium dioxide, silica, mica, barium sulfate, wollastonite, acrylics, and other similar or suitable materials.

Other optional ingredients that may be included in the PVC or PE material include, but are not limited to, polymers, plastics, thermoplastics, rubber, cross-linking agents, accelerators, inhibitors, enhancers, blowing agents/foaming agents, fillers, compatibilizers, thermosetting materials, pigments, weathering additives, and other similar or suitable materials.

Blowing agent(s) may be used to reduce the cost (e.g., by reducing the amount of polymer used in the composite) and weight of the composite material. A blowing agent may be an endothermic or exothermic blowing agent. An example of a chemical endothermic blowing agent is Hydrocerol BIH (i.e., sodium bicarbonate/citric acid), which is available from Clariant Corp., whereas an example of a chemical exothermic foaming agent is azodicarbonamide, which is available from Uniroyal Chemical Co.

The use of thermosetting materials may, for example, reduce moisture absorption and increase the strength of products manufactured from the reinforced composite material. Examples of thermosetting materials include polyurethanes (e.g., isocyanates), phenolic resins, unsaturated polyesters, epoxy resins, and other similar or suitable materials. Combinations of the aforementioned materials are also examples of thermosetting materials.

Pigments may be used to give the composite a desired color (e.g., white, cedar, gray, and redwood). Examples of pigments include titanium dioxide, iron oxide, and other similar or suitable colorant additives.

Titanium dioxide is also an example of a weathering additive. Other similar or suitable weathering additives include, but are not limited to, other ultraviolet absorbers. Examples of other ultraviolet absorbers include organic chemical agents such as benzophenone and benzotriazole types.

The substrate may not provide the desired aesthetic characteristics. As a result, exemplary embodiments of the present invention may provide a cap layer on the substrate. In an exemplary embodiment, the cap layer may be comprised of PVC, PE, or another similar or suitable material. The use of a cap layer may enable lower cost, less attractive, yet structurally desirable materials that may have a high cellulosic content to be used as the base substrate. For instance, the cap layer may be applied on the substrate to provide an attractive and protective finish for the component. For example, the cap layer may be provided in any desired color (e.g., to match the appearance of a deck or building exterior), and it may have a smooth outer surface or a pattern or texture formed on its outer surface.

One exemplary embodiment of a cap layer may be made from a plastic material, which may, for example, be comprised of a blend of two or more polymers. In particular, any number of polymers may be used to obtain a blend having desirable weathering characteristics. For instance, examples of a blend include, but are not limited to, PVC compounds, PE compounds, PVC/acrylic alloys, other acrylic alloys, and other similar or suitable alloys, compounds, and mixtures having desirable weathering, aesthetic, degradation, and/or durability characteristics. In other exemplary embodiments, a suitable composite may be used as a cap layer. An example of a composite may be comprised of PVC, PE, polypropylene, or any other similar or suitable plastic.

In one exemplary embodiment, a PVC/acrylic alloy may be particularly useful for making a cap layer having desirable resistance to scratching and/or to degradation such as may be caused by UV light or other environmental factors. For example, the plastic material may include polyvinyl chloride in an amount between about 10% by weight and about 90% by weight and acrylic in an amount between about 10% by weight and about 90% by weight. In another exemplary embodiment, the plastic material may include polyvinyl chloride in an amount between about 20% by weight and about 80% by weight and acrylic in an amount between about 20% by weight and about 80% by weight. In still another exemplary embodiment, the plastic material may include polyvinyl chloride in an amount between about 40% by weight and about 60% by weight and acrylic in an amount between about 40% by weight and about 60% by weight. In yet another exemplary embodiment, the plastic material may include polyvinyl chloride in an amount of about 50% by weight and acrylic in an amount of about 50% by weight.

In another exemplary embodiment, a PE compound or mixture may be useful for making a cap layer having desirable resistance to scratching and/or to degradation such as may be caused by UV light or other environmental factors. For example, the PE compound or mixture may include polyethylene in an amount between about 20% by weight and about 70% by weight. In still another exemplary embodiment, the PE compound or mixture may include polyethylene in an amount between about 20% and about 40% by weight.

In some other exemplary embodiments of the present invention, a cap layer may be made from a plastic material that is comprised of an acrylic-styrene-acrylonitrile (i.e., ASA) material or compound. In some exemplary embodiments, the plastic material may be comprised of ASA in an amount of 100% by weight. In other exemplary embodiments, the plastic material may be comprised of a major proportion of ASA. An example of an ASA compound is Luran S, which is available from BASF Corporation of Florham Park, N.J. An ASA compound may also provide desirable weathering characteristics for some exemplary components of the present invention.

Another example of a cap layer may be a composite that has more desirable aesthetic characteristics. An exemplary embodiment of a composite may or may not be a blend of two or more polymers. Furthermore, as previously mentioned, an example of a composite may be comprised of PVC, PE, or any other similar or suitable plastic.

An exemplary embodiment of a composite cap layer preferably includes cellulosic filler, which may facilitate a desired wood-like appearance. In one example, the cellulosic filler may be included in a cap material in an amount in the range from about 20% to about 70% by weight, more preferably in an amount in the range from about 35% to about 55% by weight, and still more preferably in an amount of about 40% to about 45% by weight. In one example, the cap material may be comprised of cellulosic filler in amount of about 43% by weight.

In addition to the amount of cellulosic filler, the roughness of a cap layer may be controlled by selecting the desired size of cellulosic filler. A rough cap may facilitate a desired wood-like appearance. In some exemplary embodiments of the present invention, 40 mesh or 60 mesh cellulosic filler may be used. However, in other exemplary embodiments, smaller or larger sizes of cellulosic filler may be used. By decreasing the size of the cellulosic filler, the roughness of a resulting cap layer may be reduced. On the other hand, by increasing the size of cellulosic filler, a cap layer may be made rougher. Unless expressly claimed otherwise, it is not intended to limit the cellulosic filler to any particular mesh size.

Any suitable cellulosic filler may be used. Examples of cellulosic fillers include sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, flax, and other similar or suitable materials. In addition, it should be recognized that virgin or recycled cellulosic filler may be used.

In order to further enhance the appearance of the cap layer, streaker(s) may be used. By using streaker(s) in a cap layer, it limits the amount of streaker(s) needed as the streaker(s) are not dispersed throughout the entire cross-section of the component. A streaker refers to a color additive that has a different, preferably higher, melt index than the base plastic material used in a cap layer or a color additive that has some other distinguishing characteristic that facilitates streaking when mixed with the base plastic material used in a cap layer (e.g., a desired degree of immiscibility when mixed with the base plastic material). Examples of streakers include, but are not limited to, PVC, ABS, and polycarbonate (i.e., PC) pellets or any other suitable plastic pellet that includes a desired pigment. Examples of streakers are available from companies such as Americhem and Penn Color. Streaker(s) may be included in a cap layer in any desired amount and form. For example, in some exemplary embodiments, streaker(s) may be included in the cap layer in an amount in the range from about 0.01% to about 20% by weight, more preferably in an amount in the range from about 0.01% to about 10% by weight, and still more preferably in an amount of about 2% to about 8% by weight. A desired streaking effect may be achieved by selecting the desired amount(s), color(s), and melt index(es) of streaker(s).

In addition to cellulosic filler and optional streaker(s), the cap layer may be comprised of any desired base plastic material. For instance, in one exemplary embodiment of the present invention, a base plastic material may provide a solid or base color (e.g., brown, tan, gray, or any other desired base color), and streaker(s) may be used in addition to the solid or base color to obtain a variegated appearance. Nevertheless, it is not intended to limit the present invention to any particular base plastic material, unless expressly claimed otherwise. As previously mentioned, examples of base plastic material may include, but are not limited to, PVC material, PE material, PVC compounds, PE compounds, PVC/acrylic alloys, other acrylic alloys, acrylic-styrene-acrylonitrile (i.e., ASA), ASA compounds, and other similar or suitable alloys, compounds, and plastics.

An exemplary cap layer of the present invention may also include other ingredients as described above in reference to the plastic material of the substrate, such as other plastics, cross-linking agents, blowing agents, foaming agents, foam modifiers, lubricants, stabilizers, accelerators, inhibitors, enhancers, compatibilizers, thermosetting materials, weathering additives, rubber, colorants, process aids, and inorganic fillers. These materials may be used individually, or in combination, to improve the characteristics of the plastic material and/or enhance the manufacture or moldability thereof.

In view of the foregoing, one example of a cap layer may be PE composite. This example of a cellulosic composite material may include at least one cellulosic filler in an amount of about 20% to about 70% by weight, more preferably about 30% to about 60% by weight, still more preferably about 35% to about 55% by weight, and even more preferably about 40% to about 45% by weight. The composite may also include polyethylene resin in an amount of about 20% to about 70% by weight, more preferably about 25% to about 40% by weight, still more preferably about 25% to about 35% by weight, and even more preferably about 30% to about 35% by weight. The composite may also include talc or another suitable inorganic filler in an amount of about 0.01% to about 20% by weight (e.g., about 1% to about 20% by weight), more preferably about 5% to about 15% by weight, and still more preferably about 10% to about 15% by weight. In addition, the composite may include lubricant in an amount of about 5% to about 10% by weight and more preferably about 6% to about 9% by weight. Streaker(s) may also be included in the composite in an amount of about 0.01% to about 20% by weight, more preferably in an amount in the range from about 0.01% to about 10% by weight, and still more preferably in an amount of about 2% to about 8% by weight. The combination of cellulosic filler and streaker(s) may facilitate a desired variegated appearance that simulates natural wood.

Figure 4:
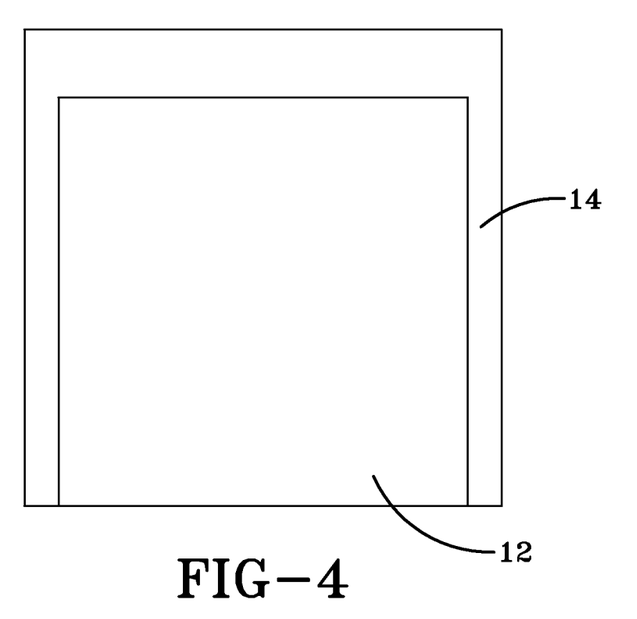
FIG. 4 is a perspective view of an example of a component made according to an exemplary embodiment of the present invention.
Figure 5:
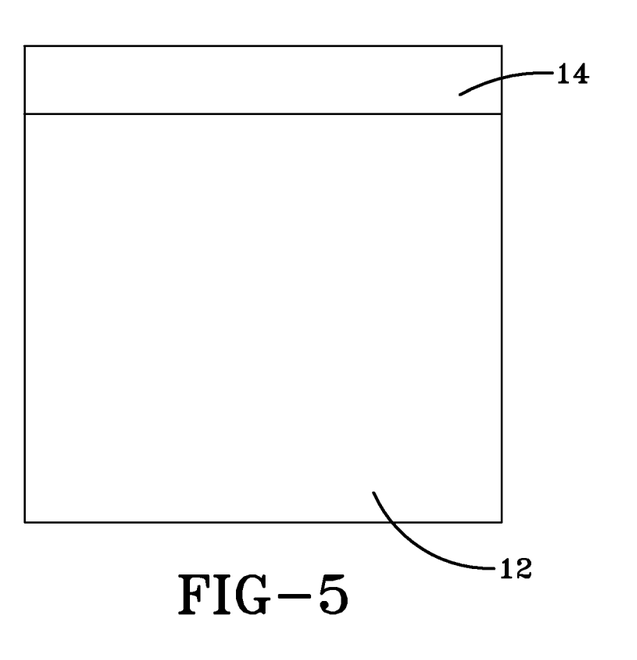
FIG. 5 is a perspective view of an example of a component made according to an exemplary embodiment of the present invention.

FIGS. 1 and 2 show examples in which the cap layer 14 covers the entire exterior surface of the profile. If desired, a cap layer 14 may also be applied on an interior surface of the profile. It should also be recognized that a cap layer 14 may only cover a limited portion of the interior or exterior surface of the substrate 12 in certain embodiments of the present invention. FIGS. 4 and 5 show examples in which a cap layer 14 only covers a portion of the substrate 12. For example, the cap layer 14 may only cover a portion of the substrate 12 that is intended to be visible during the intended use of a component, which may further help reduce the cost of the component. The cap layer 14 may have different thicknesses, depending upon the component design and intended use. In some exemplary embodiments, the cap layer 14 may have a thickness of approximately 50 mils to about 100 mils.

An exemplary component of the present invention may be manufactured using suitable manufacturing techniques. For example, the substrate and the cap layer may be co-extruded. Alternatively, the cap layer may be applied on the substrate (or vice versa) in a sequential extrusion process. Other molding techniques including, but not limited to, injection molding and compression molding may be used to manufacture a component of the present invention. In addition, it should be recognized that the layers may be formed separately and then joined then in a subsequent process, such as with the use of adhesives or other suitable bonding materials. In other examples, a component may be made using one or more manufacturing methods including, but not limited to: extrusion, co-extrusion, compression molding, and other similar or suitable manufacturing methods.

Figure 6:
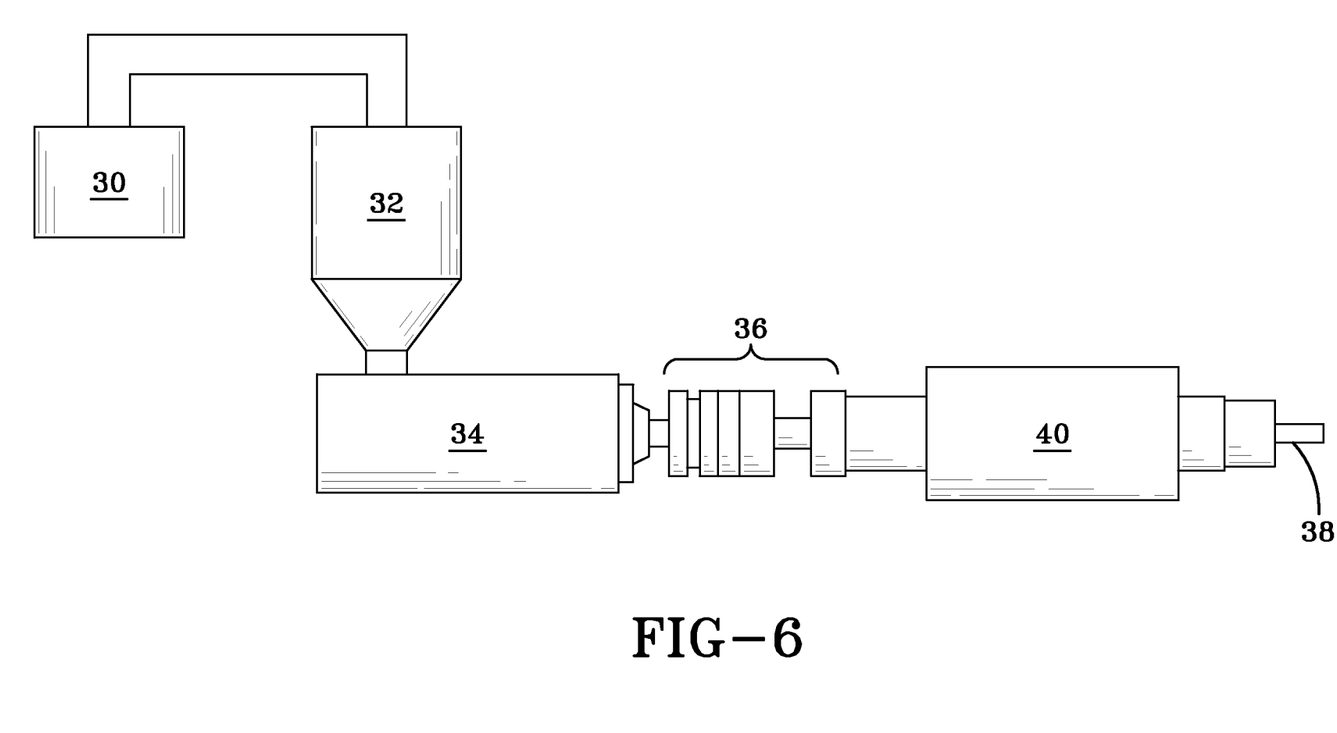
FIG. 6 is an example of an extrusion system that may be used to make a component of one exemplary embodiment of the present invention.

FIG. 6 is an example of an extrusion system that may be used to make a component of one exemplary embodiment of the present invention. The ingredients of one wood composite material may be physically mixed or blended by any conventional mixing device or industrial blender 30. The composition may then be placed into a feed hopper 32. Feed hoppers such as gravity feed or force feed mechanisms (having a crammer) may be used. After the materials are mixed and transferred to the hopper 32, they may be delivered to a heated extruder 34 where they are processed at a suitable speed and temperature. Several well-known extruders may be used in the exemplary embodiments of the present invention. For example, a twin screw extruder by Cincinnati Milacron (CM80-HP) may be used. In the extruder 34, the materials may be blended and heated and then forced into a die system 36. The die system 36 can be made up of one or more plates. The die system 36 allows the starting materials to bond and form a shaped product. The extruded material 38 may then, for example, be cooled in a cooling chamber 40 and, in one exemplary embodiment, be later secured to a cap layer and cut to a required size.

Figure 7:
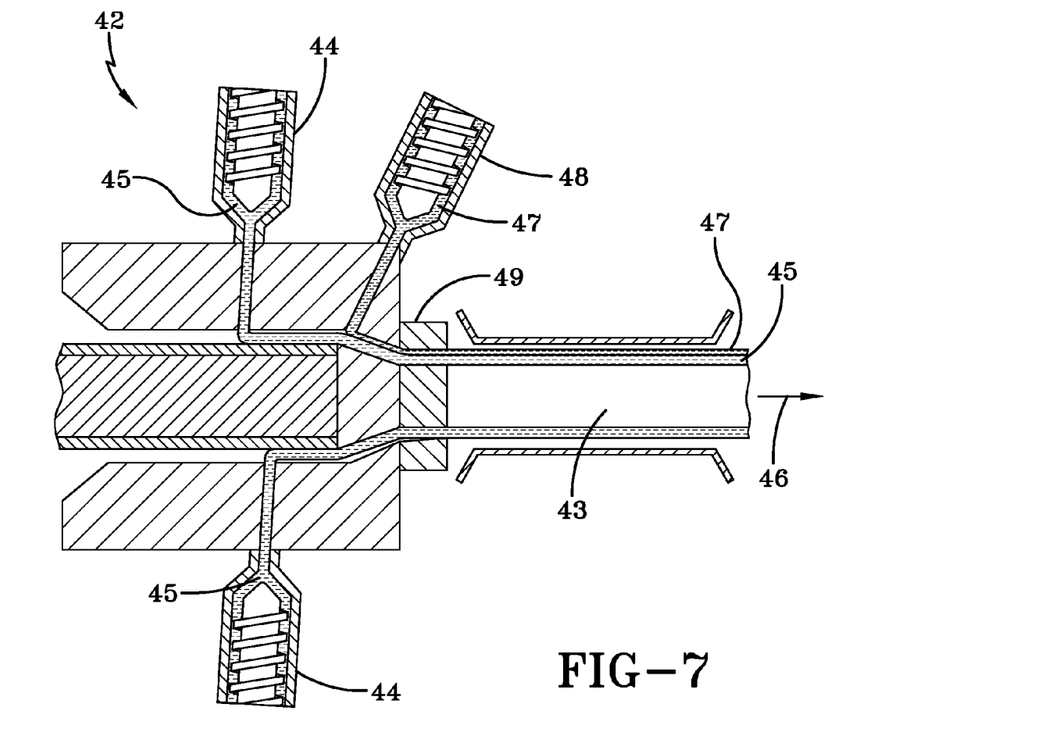
FIG. 7 is a cross-sectional view of one exemplary embodiment of a co-extrusion system that may be used when practicing an exemplary embodiment of the present invention.

In another exemplary embodiment, a cap layer may be simultaneously processed in a system similar to the one described above, and the melt flows from each of the extruders can be joined in the same die system to form the desired profile. A cross-sectional view of one example of such a co-extrusion system is shown in FIG. 7. In FIG. 7, a co-extrusion apparatus 42 may include at least one extruder 44 which is adapted to prepare a first wood composite material 45 for extrusion through a cross-head die 49 which forms a profile 43 and urges it along longitudinal direction 46. As shown in this example, the co-extrusion apparatus may include two extruders 44 for providing the first wood composite material 45 to the cross-head die 49. At least one other layer of cap material such as layer 47 may be added through the use of at least one additional extruder such as extruder 48. Layer 45 and layer 47 are formed by the forming die 49 into the desired final shape 43, e.g., a hollow or solid cross-section. In this example, a cross-sectional view of a hollow profile 43 is shown. The hollow profile 43 is comprised of an inner substrate layer 45 and a cap layer 47 that are intimately bonded. Although not shown, it should be recognized that a tie layer may be extruded between layers 45 and 47, if desired or necessary. In some exemplary embodiments, resin compatibility may be sufficient to secure substrate layer 45 to cap layer 47.

Figure 8:
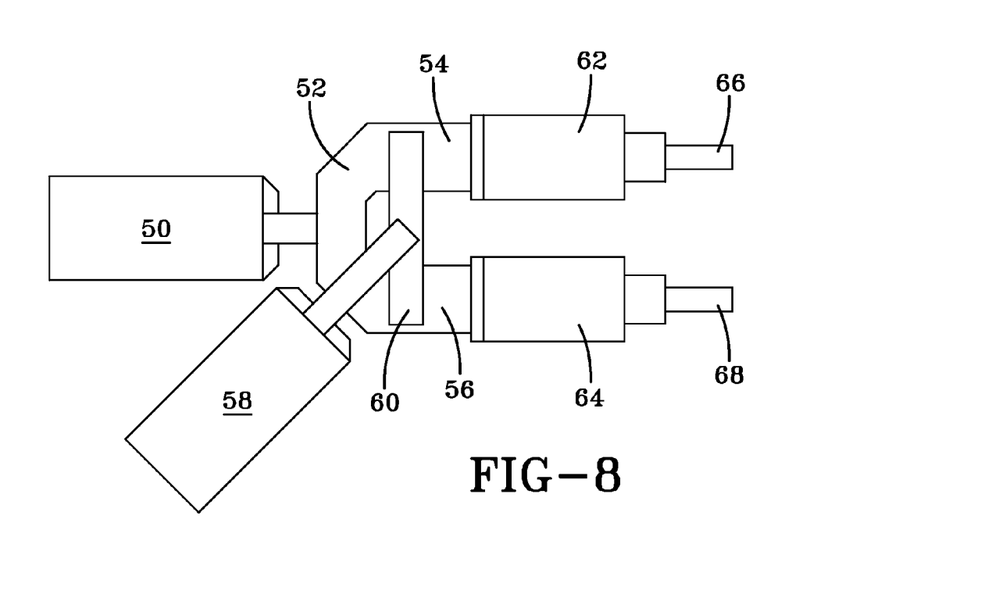
FIG. 8 is an example of an extrusion system that may be used to make a component of one exemplary embodiment of the present invention.

FIG. 8 shows another example of an extrusion system that may be used to form a component of one exemplary embodiment of the present invention. This exemplary embodiment may improve manufacturing efficiency by simultaneously producing multiple components and overcoming the extrusion cooling limitations of a substantially similar single component that is produced at a substantially same rate. A main extruder 50 may receive a first material where it is processed at a suitable speed and temperature. The main extruder 50 may heat and blend the material and force it to a junction 52. The junction 52 may split the heated material flow into multiple flows, such as, a first flow and a second flow. The first flow may travel through a first branch 54 of the junction 52, and the second flow may travel through a second branch 56 of the junction 52. The junction 52 may include as many branches as desired, to enable the system to form as many simultaneous extruded components as desired.

Figure 9:
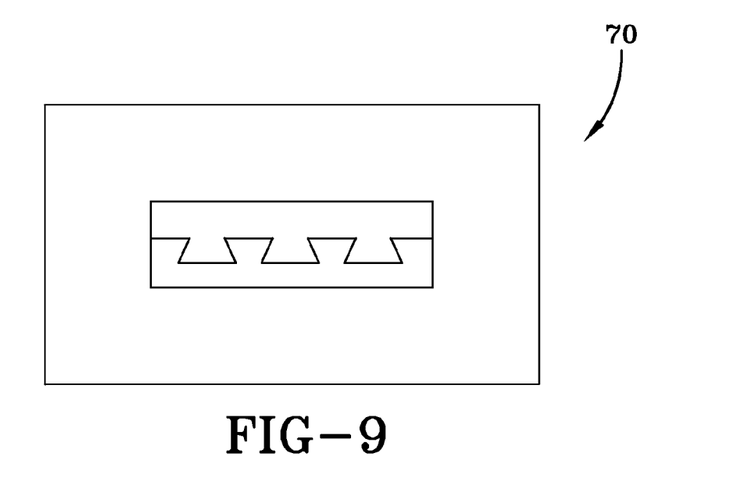
FIG. 9 is a front elevation of an exemplary embodiment of a die system that may be used when practicing an exemplary embodiment of the present invention.
Figure 10:
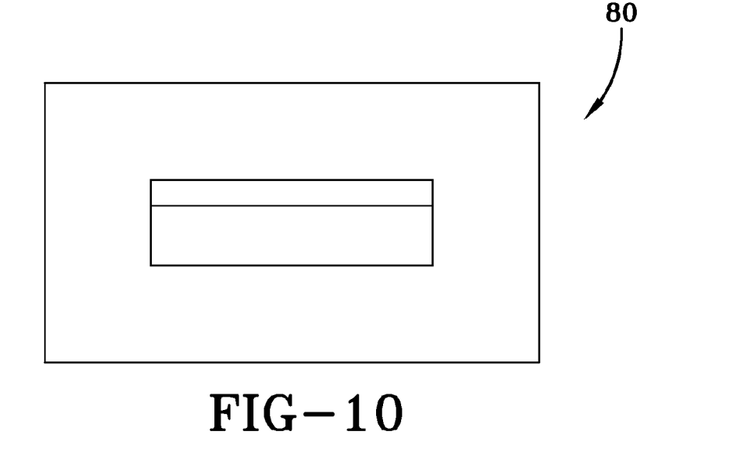
FIG. 10 is a front elevation of an exemplary embodiment of a die system that may be used when practicing an exemplary embodiment of the present invention.

A second extruder 58 may receive a second material where it is processed at a suitable speed and temperature. The second extruder 58 may force the second material through a bracket or portion 60 to the first branch 54 and second branch 56 to co-extrude the second material with the first material. Any number of additional extruders may be used to apply as many layers as desired. In one exemplary embodiment, the first material may be a substrate layer, and the second material may be a cap layer. The cap layer may be applied to any suitable side or sides of the substrate layer or may be applied to all of the sides of the substrate layer. The first flow may pass through the first branch 54 to a first die system 62. The second flow may pass through the second branch 56 to a second die system 64. The first and second die systems, 62 and 64 respectively, may have any size and shape desired. The first and second flows may exit the die systems as first extruded component 66 and second extruded component 68. The extruded components may optionally be passed on to a cooling system or systems. Such an extrusion system may allow multiple components to be formed simultaneously. For example, a four-branch junction could form four different shaped components simultaneously. Each component may have a substrate layer and a cap layer. FIGS. 9 and 10 illustrate examples of die systems that may be used in exemplary embodiments of the present invention. FIG. 9 shows an example of a die system 70 adapted to interlock a substrate layer and a cap layer, whereas FIG. 10 shows an example of a die system 80 adapted to form a cap layer on a top surface of a substrate layer.

EXAMPLES

One example of a composite that is suitable for a substrate comprises ingredients in the following amounts:

| INGREDIENT | PARTS PER 100 PARTS OF RESIN | WEIGHT PERCENT |
| --- | --- | --- |
| wood flour | 150 | 55.1 |
| PVC resin | 100 | 36.8 |
| lubricant | 7.5 | 2.8 |

-continued

| INGREDIENT | PARTS PER 100 PARTS OF RESIN | WEIGHT PERCENT |
|---|---|---|
| acrylic modifier | 6 | 2.2 |
| calcium carbonate | 5 | 1.8 |
| tin stabilizer | 2.5 | 0.9 |
| process aid | 1 | 0.4 |

Another example of a composite that is suitable for a substrate comprises ingredients in the following amounts:

| INGREDIENT | PARTS PER 100 PARTS OF RESIN | WEIGHT PERCENT |
|---|---|---|
| wood flour | 183 | 60 |
| PVC resin | 100 | 32.8 |
| lubricant | 7.5 | 2.5 |
| acrylic modifier | 6 | 2 |
| calcium carbonate | 5 | 1.6 |
| tin stabilizer | 2.5 | 0.8 |
| process aid | 1 | 0.3 |

A third example of a composite that is suitable for a substrate comprises ingredients in the following amounts:

| INGREDIENT | PARTS PER 100 PARTS OF RESIN | WEIGHT PERCENT |
|---|---|---|
| wood flour | 146.6 | 50.0 |
| PVC resin | 100 | 34.1 |
| ABS resin | 18.4 | 6.3 |
| thermal stabilizer | 3.75 | 1.3 |
| lubricant | 10 | 3.4 |
| impact modifier | 6.0 | 2.1 |
| process aid | 1 | 0.3 |
| calcium carbonate | 7.5 | 2.6 |

A fourth example of a composite that is suitable for a substrate comprises ingredients in the following amounts:

| INGREDIENT | PARTS PER 100 PARTS OF RESIN | WEIGHT PERCENT |
|---|---|---|
| wood flour | 179.3 | 55.0 |
| PVC resin | 100 | 30.7 |
| ABS resin | 18.4 | 5.7 |
| thermal stabilizer | 3.75 | 1.2 |
| lubricant | 10 | 3.1 |
| impact modifier | 6.0 | 1.8 |
| process aid | 1 | 0.3 |
| calcium carbonate | 7.5 | 2.3 |

A fifth example of a composite that is suitable for a substrate comprises ingredients in the following amounts:

| INGREDIENT | PARTS PER 100 PARTS OF RESIN | WEIGHT PERCENT |
|---|---|---|
| wood flour | 220 | 60.0 |
| PVC resin | 100 | 27.3 |
| ABS resin | 18.4 | 5.0 |
| thermal stabilizer | 3.75 | 1.0 |
| lubricant | 10 | 2.7 |
| impact modifier | 6.0 | 1.6 |
| process aid | 1 | 0.3 |
| calcium carbonate | 7.5 | 2.1 |

A sixth example of a composite that is suitable for a substrate comprises ingredients in the following amounts:

| INGREDIENT | PARTS PER 100 PARTS OF RESIN | WEIGHT PERCENT |
|---|---|---|
| wood flour | 333.35 | 50.0 |
| PE resin | 100 | 15.0 |
| lubricant | 35 | 5.3 |
| talc | 98.3 | 14.8 |
| Recycled PE | 100 | 15.0 |

A first example of a composite that is suitable for a cap layer comprises ingredients in the following amounts:

| INGREDIENT | PARTS PER 100 PARTS OF RESIN | WEIGHT PERCENT |
|---|---|---|
| wood flour | 133 | 43.2 |
| PE | 100 | 32.5 |
| lubricant | 24.9 | 8.1 |
| Talc | 38.2 | 12.4 |
| Colorant | 11.5 | 3.8 |

A second example of a composite that is suitable for a cap layer comprises ingredients in the following amounts:

| INGREDIENT | PARTS PER 100 PARTS OF RESIN | WEIGHT PERCENT |
|---|---|---|
| wood flour | 133 | 42.5 |
| PE | 100 | 31.9 |
| lubricant | 24.9 | 8.0 |
| Talc | 38.2 | 12.2 |
| Colorant | 16.9 | 5.3 |

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A coextruded component comprising:
    a substrate layer comprising:
        (a) cellulosic material in an amount between about 30% by weight to about 70% by weight of said substrate material; and
        (b) polyethylene material in an amount between about 30% by weight to about 70% by weight of said substrate material, said polyethylene material comprising polyethylene resin; and
    a cap layer secured to said substrate layer, said cap layer comprising:
        (a) cellulosic material in an amount between about 20% by weight and about 70% by weight of said cap layer;

(b) polyethylene resin in an amount between about 20% by weight and about 70% by weight of said cap layer; and (c) at least one streaker in a total amount between about 0.01% by weight and about 20% by weight of said cap layer.

2. The coextruded component of claim 1 wherein the coextruded component is a deck board.

3. The coextruded component of claim 1 wherein the coextruded component is a hollow deck rail.

4. The coextruded component of claim 1 wherein:
said substrate layer comprises:
(a) said cellulosic material in an amount between about 40% by weight to about 60% by weight of said substrate material; and
(b) said polyethylene material in an amount between about 30% by weight to about 60% by weight of said substrate material; and
said cap layer comprises:
(a) said cellulosic material in an amount between about 35% by weight and about 55% by weight of said cap layer;
(b) said polyethylene resin in an amount between about 25% by weight and about 40% by weight of said cap layer; and
(c) said at least one streaker in a total amount between about 0.01% by weight and about 10% by weight of said cap layer.

5. The coextruded component of claim 4 wherein said substrate and/or cap layer further comprises at least one inorganic filler in a total amount between about 1% by weight and about 20% by weight of said layer.

6. The coextruded component of claim 4 wherein said substrate and/or cap layer further comprises at least one inorganic filler in a total amount between about 5% by weight and about 15% by weight of said layer.

7. The coextruded component of claim 6 wherein said at least one inorganic filler comprises talc.

8. The coextruded component of claim 1 wherein:
said substrate layer comprises:
(a) said cellulosic material in an amount of about 55% by weight of said substrate material; and
(b) said polyethylene material in an amount of about 30% to about 45% by weight of said substrate material; and
said cap layer comprises:
(a) said cellulosic material in an amount between about 40% by weight and about 45% by weight of said cap layer;
(b) said polyethylene resin in an amount between about 25% by weight and about 35% by weight of said cap layer; and
(c) said at least one streaker in a total amount between about 2% by weight and about 8% by weight of said cap layer.

9. The coextruded component of claim 8 wherein said substrate and/or cap layer further comprises at least one inorganic filler in a total amount between about 1% by weight and about 20% by weight of said layer.

10. The coextruded component of claim 8 wherein said substrate and/or cap layer further comprises at least one inorganic filler in a total amount between about 5% by weight and about 15% by weight of said layer.

11. The coextruded component of claim 10 wherein said at least one inorganic filler comprises talc.

12. A coextruded deck board comprising:
a substrate layer comprising:
(a) cellulosic material in an amount between about 40% by weight to about 60% by weight of said substrate material; and
(b) polyethylene material in an amount between about 30% by weight to about 60% by weight of said substrate material, said polyethylene material comprising polyethylene resin; and
a cap layer secured to said substrate layer, said cap layer comprising:
(a) cellulosic material in an amount between about 40% by weight and about 45% by weight of said cap layer;
(b) polyethylene resin in an amount between about 30% by weight and about 35% by weight of said cap layer; and
(c) at least one streaker in a total amount between about 0.01% by weight and about 10% by weight of said cap layer.

13. The coextruded deck board of claim 12 wherein said substrate and/or cap layer further comprises at least one inorganic filler in a total amount between about 5% by weight and about 15% by weight of said layer.

14. The coextruded deck board of claim 13 wherein:
said at least one streaker is in a total amount between about 2% by weight and about 8% by weight; and
said at least one inorganic filler is in a total amount between about 10% by weight and about 15% by weight of said cap layer.

15. A method of forming a cellulosic composite component, said method comprising:
providing an extrusion system comprising:
a plurality of extruders; and
at least one die system;
providing a substrate material to a first extruder of said extruders, said substrate material comprising:
(a) cellulosic material in an amount between about 30% by weight to about 70% by weight of said substrate material; and
(b) polyethylene material in an amount between about 30% by weight to about 70% by weight of said substrate material, said polyethylene material comprising polyethylene resin; and
providing a cap layer material to a second extruder of said extruders, said cap layer material comprising:
(a) cellulosic material in an amount between about 20% by weight and about 70% by weight of said cap layer;
(b) polyethylene resin in an amount between about 20% by weight and about 70% by weight of said cap layer; and
(c) at least one streaker in a total amount between about 0.01% by weight and about 20% by weight of said cap layer;
extruding said substrate material;
co-extruding said cap layer material onto at least a portion of said substrate material;
forming a flow of said substrate material and said cap layer material; and
forcing said flow through said at least one die system to form at least one component.

16. The method of claim 15 wherein said component is hollow deck rail.

17. The method of claim 15 wherein said component is a deck board.

18. The method of claim 15 wherein said extrusion system comprises a junction associated with said extruders and a plurality of branches associated with said junction, said method further comprising:
    extruding said substrate material through said junction and said plurality of branches;
    co-extruding said cap layer material onto at least a portion of said substrate material forming a plurality of flows from said substrate material and said cap layer material; and
    forcing said flows respectively through a plurality of die systems to simultaneously form a plurality of components.

19. The method of claim 15 wherein said cap layer material substantially covers an entire exterior surface of said substrate material of said component.

20. The method of claim 15 wherein:
said substrate layer comprises:
    (a) said cellulosic material in an amount between about 40% by weight to about 60% by weight of said substrate material; and
    (b) said polyethylene material in an amount between about 30% by weight to about 60% by weight of said substrate material; and
said cap layer comprises:
    (a) said cellulosic material in an amount between about 40% by weight and about 45% by weight of said cap layer;
    (b) said polyethylene resin in an amount between about 30% by weight and about 35% by weight of said cap layer;
    (c) said at least one streaker in a total amount between about 0.01% by weight and about 10% by weight of said cap layer; and
    (d) at least one inorganic filler in a total amount between about 5% by weight and about 15% by weight of said cap layer.

* * * * *